US010058808B2

(12) United States Patent
Haberkamp et al.

(10) Patent No.: US 10,058,808 B2
(45) Date of Patent: Aug. 28, 2018

(54) COMPOSITE FILTER MEDIA UTILIZING BICOMPONENT FIBERS

(71) Applicant: Cummins Filtration IP, Inc., Columbus, IN (US)

(72) Inventors: William C. Haberkamp, Cookeville, TN (US); Eric A. Janikowski, Jefferson, WI (US); Kyle Ellison, Hermitage, TN (US); Barry Mark Verdegan, Stoughton, WI (US); Christopher E. Holm, Madison, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 597 days.

(21) Appl. No.: 13/827,968

(22) Filed: Mar. 14, 2013

(65) Prior Publication Data
US 2014/0110354 A1    Apr. 24, 2014

Related U.S. Application Data

(60) Provisional application No. 61/716,904, filed on Oct. 22, 2012.

(51) Int. Cl.
*B01D 39/00* (2006.01)
*B01D 39/16* (2006.01)
B01D 37/00 (2006.01)

(52) U.S. Cl.
CPC .... *B01D 39/163* (2013.01); *B01D 2239/0216* (2013.01); *B01D 2239/0668* (2013.01); *B01D 2239/1216* (2013.01); *B01D 2239/1233* (2013.01)

(58) Field of Classification Search
None
See application file for complete search history.

(56) References Cited

U.S. PATENT DOCUMENTS

| | | |
|---|---|---|
| 3,890,123 A | 6/1975 | Kuga |
| 4,210,697 A | 7/1980 | Adiletta |
| 4,229,297 A | 10/1980 | Nohmi et al. |
| 4,309,475 A | 1/1982 | Hoffman, Jr. |
| 4,460,648 A | 7/1984 | Kondo et al. |
| 4,547,420 A | 10/1985 | Krueger et al. |
| 4,552,603 A | 11/1985 | Harris, Jr. et al. |

(Continued)

FOREIGN PATENT DOCUMENTS

| | | |
|---|---|---|
| CN | 1890419 A | 1/2007 |
| CN | 101098741 A | 1/2008 |

(Continued)

OTHER PUBLICATIONS

Bicomponent Fiber, Feb. 19, 2003, one page, accessed online Jul. 29, 2015.*

(Continued)

*Primary Examiner* — Allison G Fitzsimmons
(74) *Attorney, Agent, or Firm* — Foley & Lardner LLP

(57) ABSTRACT

Disclosed is composite media that may be utilized in coalescing elements, coalescing cartridges, coalescing systems, and coalescing methods. The disclosed media typically is a composite or laminate material formed by bonding adjacent layers of media material comprising bicomponent fibers.

32 Claims, 5 Drawing Sheets

(56) References Cited

U.S. PATENT DOCUMENTS

| | | | |
|---|---|---|---|
| 4,615,804 A * | 10/1986 | Wright | B01D 29/012 210/493.1 |
| 4,663,221 A | 5/1987 | Makimura et al. | |
| 4,707,399 A | 11/1987 | Rambosek | |
| 4,729,371 A | 3/1988 | Krueger et al. | |
| 4,732,809 A | 3/1988 | Harris, Jr. et al. | |
| 4,795,668 A | 1/1989 | Krueger et al. | |
| 4,824,623 A | 4/1989 | Rambosek | |
| 5,019,211 A | 5/1991 | Sauer | |
| 5,116,524 A | 5/1992 | Carduck et al. | |
| 5,130,195 A | 7/1992 | Sampanis et al. | |
| 5,167,765 A | 12/1992 | Nielsen et al. | |
| 5,232,647 A | 8/1993 | Sampanis et al. | |
| 5,284,704 A | 2/1994 | Kochesky et al. | |
| 5,372,885 A | 12/1994 | Tabor et al. | |
| 5,443,724 A | 8/1995 | Williamson et al. | |
| 5,509,430 A | 4/1996 | Berger | |
| 5,540,992 A | 7/1996 | Marcher et al. | |
| 5,580,459 A | 12/1996 | Powers et al. | |
| 5,607,766 A | 3/1997 | Berger | |
| 5,620,641 A | 4/1997 | Berger | |
| 5,633,082 A | 5/1997 | Berger | |
| 5,669,796 A | 9/1997 | Harford | |
| 5,702,658 A | 12/1997 | Pellegrin et al. | |
| 5,723,215 A | 3/1998 | Hernandez et al. | |
| 5,786,059 A | 7/1998 | Frank et al. | |
| 5,885,390 A | 3/1999 | Alkire et al. | |
| 5,885,705 A | 3/1999 | Kent et al. | |
| 5,888,651 A | 3/1999 | Hoyt et al. | |
| 5,888,915 A | 3/1999 | Denton et al. | |
| 5,948,528 A | 9/1999 | Helms, Jr. et al. | |
| 5,948,529 A | 9/1999 | Hastie | |
| 6,004,674 A | 12/1999 | Kent et al. | |
| 6,026,819 A | 2/2000 | Berger | |
| 6,039,903 A | 3/2000 | Kent et al. | |
| 6,074,590 A | 6/2000 | Gownder | |
| 6,153,138 A | 11/2000 | Helms, Jr. et al. | |
| 6,174,601 B1 | 1/2001 | Stanitis et al. | |
| 6,174,603 B1 | 1/2001 | Berger | |
| 6,207,276 B1 | 3/2001 | Spindler et al. | |
| 6,251,224 B1 | 6/2001 | Dong | |
| 6,312,545 B1 | 11/2001 | Nickel et al. | |
| 6,316,103 B1 | 11/2001 | Stanitis et al. | |
| 6,332,994 B1 | 12/2001 | Karageorgiou | |
| 6,395,392 B1 | 5/2002 | Gownder | |
| 6,461,133 B1 | 10/2002 | Lake et al. | |
| 6,474,967 B1 | 11/2002 | Haynes et al. | |
| 6,632,313 B2 | 10/2003 | Nickel et al. | |
| 6,641,916 B1 | 11/2003 | Chang et al. | |
| 6,648,926 B1 | 11/2003 | Immediato | |
| 6,656,586 B2 | 12/2003 | Hartzog et al. | |
| 6,673,158 B1 | 1/2004 | Ouellette et al. | |
| 6,692,687 B2 | 2/2004 | Chang et al. | |
| 6,773,810 B2 | 8/2004 | Sen et al. | |
| 6,783,854 B2 | 8/2004 | Bond | |
| 6,811,871 B2 | 11/2004 | Sen et al. | |
| 6,846,561 B1 | 1/2005 | Gownder et al. | |
| 6,841,245 B2 | 2/2005 | Chang et al. | |
| 6,860,917 B2 | 3/2005 | Henrichsen et al. | |
| 6,877,197 B1 | 4/2005 | Van Trump et al. | |
| 6,887,343 B2 | 5/2005 | Schukar et al. | |
| 6,946,012 B1 | 9/2005 | Miller et al. | |
| 6,953,622 B2 | 10/2005 | Tsai et al. | |
| 6,974,628 B2 | 12/2005 | Van Trump et al. | |
| 7,011,885 B2 | 3/2006 | Chang et al. | |
| 7,033,530 B2 | 4/2006 | Chang et al. | |
| 7,081,423 B2 | 7/2006 | Abed et al. | |
| 7,087,301 B2 | 8/2006 | Musgrave et al. | |
| 7,135,228 B2 | 11/2006 | Sen et al. | |
| 7,147,815 B2 | 12/2006 | Chang et al. | |
| 7,160,091 B2 | 1/2007 | Baumeister | |
| 7,195,819 B2 | 3/2007 | Hietpas et al. | |
| 7,235,124 B2 | 6/2007 | Liu et al. | |
| 7,250,126 B2 | 7/2007 | Haberkamp et al. | |
| 7,290,668 B2 | 11/2007 | Ward et al. | |
| 7,310,933 B2 | 12/2007 | Hietpas et al. | |
| 7,314,558 B1 | 1/2008 | Jaroszczyk et al. | |
| 7,354,478 B2 | 4/2008 | Yang et al. | |
| 7,357,985 B2 | 4/2008 | Kurian et al. | |
| 7,604,859 B2 | 10/2009 | Liu et al. | |
| 7,615,173 B2 | 11/2009 | Van Trump | |
| 7,648,546 B2 | 1/2010 | Haberkamp et al. | |
| 7,655,070 B1 * | 2/2010 | Dallas | B01D 39/04 210/502.1 |
| 7,662,323 B1 | 2/2010 | Flood et al. | |
| 7,674,425 B2 | 3/2010 | Schwandt et al. | |
| 7,727,627 B2 | 6/2010 | Sen et al. | |
| 7,754,123 B2 | 7/2010 | Verdegan et al. | |
| 7,838,449 B2 | 11/2010 | Black et al. | |
| 7,910,208 B2 | 3/2011 | Flood et al. | |
| 7,981,226 B2 | 7/2011 | Pourdeyhimi et al. | |
| 8,002,990 B2 | 8/2011 | Schroeder et al. | |
| 8,003,209 B2 | 8/2011 | Flood et al. | |
| 8,007,699 B2 | 8/2011 | Bieser et al. | |
| 8,142,584 B2 | 3/2012 | Yang et al. | |
| 8,231,752 B2 | 7/2012 | Janikowski et al. | |
| 8,360,251 B2 | 1/2013 | Wieczorek et al. | |
| 8,389,426 B2 | 3/2013 | Dahringer et al. | |
| 8,420,556 B2 | 4/2013 | Pourdeyhimi et al. | |
| 8,517,185 B2 | 8/2013 | Wieczorek et al. | |
| 8,590,712 B2 | 11/2013 | Wieczorek et al. | |
| 8,678,202 B2 | 3/2014 | Wieczorek et al. | |
| 9,199,185 B2 | 12/2015 | Verdegan et al. | |
| 2002/0025433 A1 | 2/2002 | Chang et al. | |
| 2002/0100541 A1 | 8/2002 | Nickel et al. | |
| 2002/0177379 A1 | 11/2002 | Abed et al. | |
| 2003/0039833 A1 | 2/2003 | Sen et al. | |
| 2003/0055162 A1 | 3/2003 | Sen et al. | |
| 2003/0082377 A1 | 5/2003 | Hartzog et al. | |
| 2003/0091821 A1 | 5/2003 | Bond | |
| 2004/0084796 A1 | 5/2004 | Chang et al. | |
| 2004/0094459 A1 | 5/2004 | Prater et al. | |
| 2004/0126578 A1 | 7/2004 | Tsai et al. | |
| 2004/0137211 A1 | 7/2004 | Ouellette et al. | |
| 2004/0170831 A1 | 9/2004 | Sen et al. | |
| 2004/0191513 A1 | 9/2004 | Chang et al. | |
| 2004/0222544 A1 | 11/2004 | Chang et al. | |
| 2004/0247868 A1 | 12/2004 | Van Trump | |
| 2005/0031863 A1 | 2/2005 | Gownder et al. | |
| 2005/0061456 A1 | 3/2005 | Sen et al. | |
| 2005/0093196 A1 | 5/2005 | Chang et al. | |
| 2005/0095427 A1 | 5/2005 | Chang et al. | |
| 2005/0123752 A1 | 6/2005 | Van Tramp et al. | |
| 2005/0175835 A1 | 8/2005 | Musgrave et al. | |
| 2005/0186877 A1 | 8/2005 | Yang et al. | |
| 2005/0189292 A1 | 9/2005 | Ward et al. | |
| 2005/0196612 A1 | 9/2005 | Flood et al. | |
| 2005/0233018 A1 | 10/2005 | Baumeister | |
| 2006/0024496 A1 | 2/2006 | Hietpas et al. | |
| 2006/0070294 A1 | 4/2006 | Spittle | |
| 2006/0110598 A9 | 5/2006 | Musgrave et al. | |
| 2006/0207234 A1 | 9/2006 | Ward et al. | |
| 2006/0292355 A1 | 12/2006 | Pourdeyhimi et al. | |
| 2007/0004830 A1 | 1/2007 | Flood et al. | |
| 2007/0020453 A1 | 1/2007 | Sen et al. | |
| 2007/0031668 A1 | 2/2007 | Hietpas et al. | |
| 2007/0035057 A1 | 2/2007 | Chang et al. | |
| 2007/0039300 A1 * | 2/2007 | Kahlbaugh et al. | 55/527 |
| 2007/0062887 A1 | 3/2007 | Schwandt et al. | |
| 2007/0065664 A1 | 3/2007 | Kurian et al. | |
| 2007/0071974 A1 | 3/2007 | Hietpas et al. | |
| 2007/0173161 A1 | 7/2007 | Allgeuer et al. | |
| 2008/0053888 A1 | 3/2008 | Ellis et al. | |
| 2008/0057309 A1 | 3/2008 | Liu et al. | |
| 2008/0139068 A1 | 6/2008 | Yang et al. | |
| 2008/0143009 A1 | 6/2008 | Kurian et al. | |
| 2008/0160278 A1 | 7/2008 | Cheng et al. | |
| 2008/0187751 A1 | 8/2008 | Ward et al. | |
| 2008/0202078 A1 * | 8/2008 | Healey | B01D 39/1623 55/341.1 |
| 2008/0311814 A1 | 12/2008 | O'Sickey et al. | |
| 2009/0025151 A1 | 1/2009 | Marazzi et al. | |
| 2009/0050578 A1 | 2/2009 | Israel et al. | |
| 2009/0188870 A1 | 7/2009 | Schroeder et al. | |

(56) References Cited

U.S. PATENT DOCUMENTS

| | | |
|---|---|---|
| 2009/0227166 A1 | 9/2009 | Goda |
| 2009/0258191 A1 | 10/2009 | Peacock |
| 2009/0297809 A1 | 12/2009 | Black et al. |
| 2010/0038815 A1 | 2/2010 | Flood et al. |
| 2010/0047571 A1 | 2/2010 | Bieser et al. |
| 2010/0206803 A1* | 8/2010 | Ward ............... B01D 39/1623 210/491 |
| 2011/0028062 A1 | 2/2011 | Chester et al. |
| 2011/0165470 A1 | 7/2011 | Dahringer et al. |
| 2011/0168621 A1 | 7/2011 | Wieczorek et al. |
| 2011/0168647 A1* | 7/2011 | Wieczorek ........... B01D 17/045 210/799 |
| 2011/0210081 A1 | 9/2011 | Green et al. |
| 2011/0244750 A1 | 10/2011 | Bieser et al. |
| 2011/0250812 A1 | 10/2011 | Pourdeyhimi et al. |
| 2012/0175298 A1 | 7/2012 | Gupta et al. |
| 2012/0223008 A1* | 9/2012 | Mbadinga-Mouanda ................. B01D 46/521 210/493.5 |
| 2013/0023177 A1 | 1/2013 | Claasen et al. |
| 2013/0134088 A1 | 5/2013 | Dahringer et al. |

FOREIGN PATENT DOCUMENTS

| | | |
|---|---|---|
| CN | 101282773 A | 10/2008 |
| CN | 101687128 | 3/2010 |
| DE | 10 2008 026 485 A1 | 2/2009 |
| RU | 1813498 | 5/1993 |
| RU | 2371235 | 10/2009 |
| SU | 1761201 | 9/1992 |
| WO | 2005/059219 | 6/2005 |

OTHER PUBLICATIONS

Davis, 1958, Factors Influencing the Air Permeability of Felt and Felt-Like Structures.*
Hegde et al., Apr. 2004, Bicomponent Fibers.*
International Search Report and Written Opinion based on PCT/US13/49896, dated Nov. 22, 2013, 11 pages.
Office Action issued in Chinese Patent No. 201180031592.8, dated Dec. 25, 2014.
Decision of Grant Patent for Invention issued in Russian Application No. 2013102593/05, dated Feb. 18, 2015.
Chinese Office Action issued for Chinese Patent Application No. 201380052593 point X, dated Dec. 23, 2015, 7 pages.
German Office Action and translation for German Patent Application No. 11 209 002 121.2, dated Jan. 28, 2016, 10 pages.
Office Action Issued for Chinese Patent Application No. 201510530266.1, and English language translation, dated Dec. 28, 2016, 15 pages.
First Office Action issued for Indian Patent Application No. 1513/KOLNP/2011, dated Mar. 8, 2017, 7 pages.
First Examination Report Issued for Indian Patent Application No. 4066/KOLNP/2011, dated Aug. 23, 2017, 5 pages.

* cited by examiner side-by-side sheath/core

COMPOSITE FILTER MEDIA UTILIZING BICOMPONENT FIBERS

CROSS-REFERENCE TO RELATED APPLICATIONS

The present application claims the benefit under 35 U.S.C. § 119(e) to U.S. Provisional Patent Application No. 61/716,904, filed on Oct. 22, 2012, the contents of which are incorporated herein by reference in its entirety.

BACKGROUND

The disclosed subject matter relates to composite filter media. In particular, the disclosed subject matter is related to composite filter media in laminate form prepared by bonding adjacent layers of media material comprising bicomponent fibers. The composite filter media is useful in industrial applications requiring long service life.

There is a demand for increasing the service interval for a filter without increasing the filter size, increasing the filter's pressure drop, or decreasing the filter's capabilities for removing contaminant, in particular, filter performance requirements for high pressure filtration applications, such as hydraulic and fuel filtration, are extremely demanding in terms of particulate removal, yet service intervals preferably are at least 250 hours, but ideally greater than 500 hours, 1,000 hours, or even longer. To meet these pressure drop and life requirements, specially engineered high performance filter media is needed. The demanding removal and service life requirements of some filter applications cannot be met with existing filter media and improved filter media is desirable. In particular, improved composite media and methods for forming composite media are desirable.

SUMMARY

Disclosed is composite media that may be utilized in coalescing elements, coalescing cartridges, and coalescing systems and methods. The composite media typically is formed by bonding at least three layers of media material from an upstream direction to a downstream direction, namely Layer A, optionally Layer B, Layer C, and Layer D. The layers typically have different characteristics and are designed to impart desirable properties to the coalescing media. Typically, one or more of the layers comprise bicomponent fibers. The bicomponent fibers typically comprise different polymeric materials having different physical or chemical characteristics such as melting temperature.

In some embodiments of the disclosed composite media, at least one of Layer A, Layer B, and Layer D comprise bicomponent polymeric fibers having a core and a sheath, and Layer C comprises polymeric nanofiber material. The polymeric material of the sheath of the bicomponent fibers may have a lower melting point than the polymeric material of the core. The polymeric material of the sheath of the bicomponent fibers also may have a lower melting point than the polymeric nanofiber material of Layer C. The composite media material then may be formed by bonding the polymeric nanofiber material of Layer C to the bicomponent fibers of at least one of Layer A, Layer B, and Layer D by a method that includes heating the sheath material of the bicomponent fibers and melting the sheath material of the bicomponent fibers to the polymeric nanofiber material of Layer C.

Exemplary characteristics for the layers utilized to prepare the composite media are disclosed in Table 1. In some embodiments, Layer A comprises polymeric media material having one or more of the following characteristics: (a) a nominal mean fiber diameter of greater than about 8, 9, or 10 μm; (b) a mean pore size of greater than about 10, 15, 20, or 25 μm; and (c) a permeability of greater than about 80 cfm. Optionally, Layer A comprises polymeric media material having one or more of the following characteristics: (a) a permeability of 80-325 cfm; (b) a basis weight of 20-60 gsm; and (c) a thickness of 0.1-0.5 mm.

Layer B is optional. However, in some embodiments, Layer B is not optional and Layer B comprises polymeric media material having one or more of the following characteristics: (a) a nominal mean fiber diameter of 1-5 μm; (b) a mean pore size of 5-15 μm; (c) a basis weight of 15-50 gsm; (d) and a permeability of 25-55 cfm. Optionally, Layer B comprises polymeric media material, having one or more of the following characteristics: (a) a maximum pore size of ≤30 μm; and (b) a thickness of 0.1-0.5 mm.

In some embodiments, Layer C comprises polymeric media material having one or more of the following characteristics: (a) a nominal mean fiber diameter of 0.1-5, 0.1-3, or 0.1-1 μm; (b) a mean pore size of 0.1-15 or 0.2-10 μm; and (c) a permeability of 3-55 cfm. Layer C may include nanofibers having a nominal mean fiber diameter of less than 1 μm and may be otherwise referred to as a nanofiber layer. Optionally, Layer C comprises polymeric media material having one or more of the following characteristics: (a) a maximum pore size of ≤10 μm; (b) a basis weight of 8-50 gsm; (c) and a thickness of 0.1-0.5 mm.

In some embodiments, Layer D comprises polymeric material having one or more of the following characteristics: (a) a nominal mean fiber diameter of greater than about 8, 9, or 10 μm; (b) a mean pore size of greater than about 10, 15, 20, or 25 μm; and (c) a permeability of greater than about 40 cfm. Optionally, Layer D comprises polymeric media material having one or more of the following characteristics: (a) a permeability of 40-200 cfm; (b) a basis weight of 40-200 gsm; and (c) a thickness of 0.1-0.56 mm.

In some embodiments, the composite media has a permeability of less than about 40, 30, 20, 10, or 5 cfm. Preferably, the composite media formed from the multiple layers has a permeability of about 3-40 cfm.

The disclosed composite media may be further formed as pleated filter media. In some embodiments, the pleated filter media may be over-packed, for example, where the coalescing media has a pleat density D that exceeds 1/(2H) where H is the thickness of the coalescing media. Where the composite media is pleated, it may be further configured to resist collapsing of its pleats. In some embodiments, Layer D comprises media material that is textured and comprises grooves in a direction approximately perpendicular to the pleated media bend lines in order to resist collapsing of the composite media's pleats.

The disclosed composite media may be utilized in coalescing elements, for example, coalescing elements configured for coalescing a discontinuous liquid phase from a continuous liquid phase. In some embodiments, the coalescing elements are configured for method of coalescing water immersed in a liquid hydrocarbon (e.g., hydrocarbon fuel, biodiesel fuel, or lubricating, hydraulic, or transmission oil). The coalescing elements may be utilized in filter cartridges. Suitable coalescing elements and filter cartridges that may comprise the disclosed pleated coalescing media are disclosed in U.S. Published Application No. 2011/0168621, published on Jul. 14, 2011, and U.S. Published Application No. 2011/0168647, published on Jul. 14, 2011, the contents of which are incorporated herein by reference.

DETAILED DESCRIPTION

Disclosed herein is composite media formed from multiple layers of media material. The media may be further described based on the following definitions.

Unless otherwise specified or indicated by context, the terms "a", "an", and "the" mean "one or more" or "at least one." For example, "a layer" should be interpreted to mean "one or more layers."

As used herein, "about", "approximately," "substantially," and "significanitly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising."

Figure 1:
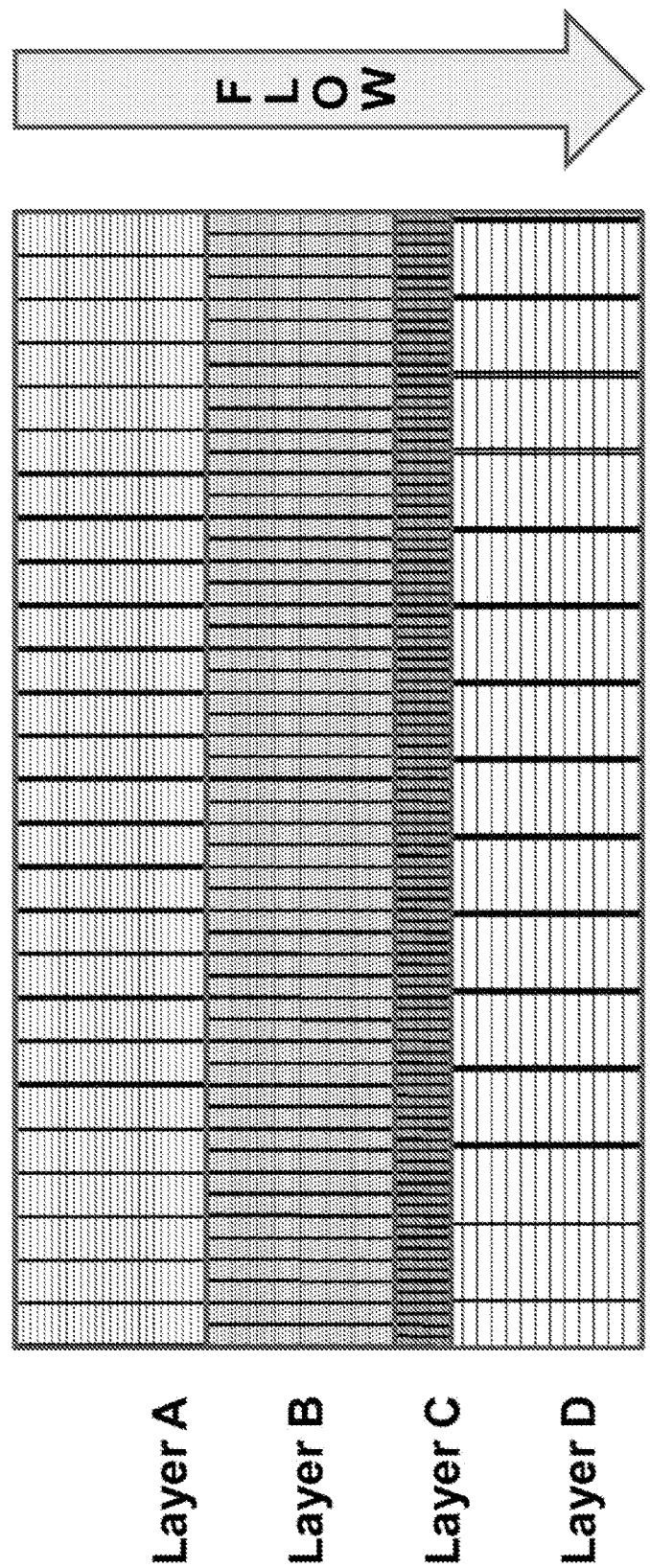
FIG. 1 provides a schematic of one embodiment of high performance composite media as contemplated herein.

The presently disclosed composite media typically is prepared from multiple layers of bonded fibrous filter media. The fibrous filter media typically comprises polymeric fibers (i.e., synthetic fibers). FIG. 1 shows one simplified schematic of the layers utilized to prepare a composite media as contemplated herein. The composite media may be prepared from at least 4 layers of media material as shown in FIG. 1 (Layers A, B, C, and D), but may include only 3 layers of media material as described below (Layers A, C, and D). Exemplary properties of each layer of media material are shown in Table 1. The layers that form the composite media may be bonded by processes that include thermal bonding (e.g., via ultrasonic bonding, hot calendering, belt calendering, through-air thermal bonding, and radiant-heat bonding), and/or chemical bonding (e.g., via the use of binders such as butadiene copolymers, acrylates, and vinyl copolymers).

In some embodiments, the disclosed media is a laminate filter media prepared by bonding a minimum of three (3) layers of media designed to provide longer service life than conventional composite or laminate filter media of equivalent contaminant removal characteristics without an increase in the size of the resultant filter element. The laminate filter media may include: (1) a coarse, open upstream layer with larger polymeric fiber designed to enable use of a pleated form of the composite media having over-packed pleat densities without significant degradation in removal nor service live; (2) optional one or more tighter polymeric layer(s) with finer fibers designed to serve as transition layer(s) in gradient filtration and to protect the filtration layer from damage by laminating; (3) a polymeric micro- or nano-fiber layer to provide high removal for fine particles at low pressure drop; and (4) a thin, coarse, open downstream layer with larger polymeric fibers designed to facilitate relatively unrestricted flow through the media under overpacked pleat densities without significant degradation in contaminant removal nor service life and to provide structural support for upstream layers.

In the presently disclosed filter media, Layers A, B and D may provide support and permit bonding of all the layers of the media into a composite such that further support (such as a screen, cellulose or other stiffer material) is not required. Layer C is sandwiched between Layers B and D, or between Layers A and D, if there is no layer B. The inclusion of optional Layer B as a transition layer with finer fibers than Layer A and coarser fibers than Layer C yields media with no significant loss in contaminate removal or change in maximum pore size. Preferably, the fiber diameter of Layer B may be intermediate between the fiber diameters of Layers A and C. Ideally, the fiber diameter of Layer B may be between 1.5 and 4 times the fiber diameter of Layer C and less than the fiber diameter of Layer A. If additional layers are incorporated between A and C, then a more gradual transition in fiber diameter from A to C is envisioned with each successive layer having a smaller fiber diameter than its preceding layer.

Figure 2:
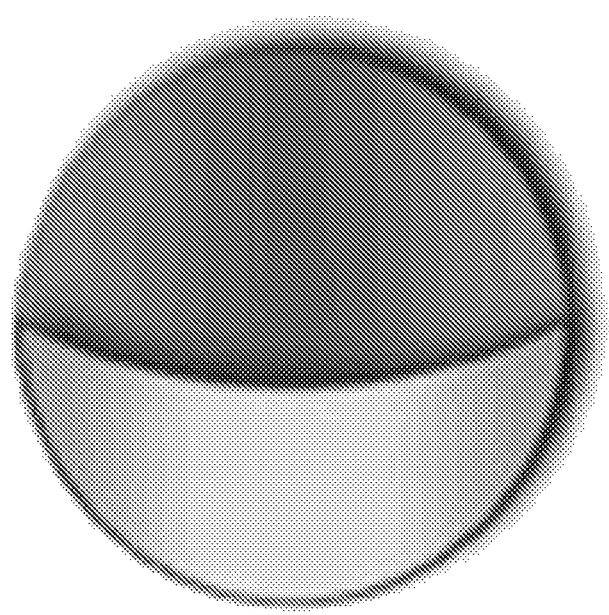
FIG. 2 provides exemplary configurations for the bicomponent fibers utilized in the presently disclosed composite media.
Figure 2:
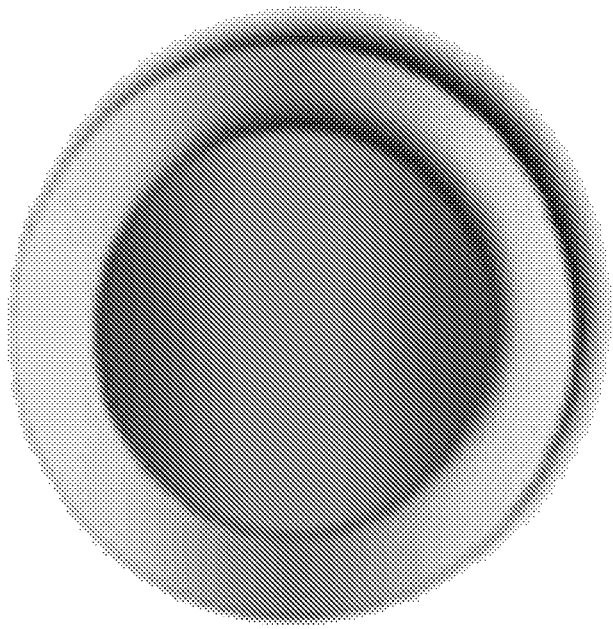

One or more of the layers of media material utilized to prepare the composite media typically comprises bicomponent fibers. As used herein, "bicomponent fibers" means fibers that are formed by extruding two different polymers from the same spinneret with both polymers being contained with the same filament. The term "conjugate fibers" may be used interchangeably with "bicomponent fibers." The bicomponent fibers utilized to prepare the presently disclosed composite media may have any suitable configurations, including but not limited to, a core and sheath configuration and a side-by-side configuration. (See FIG. 2.)

Polymer materials that may be suitable for producing bicomponent fibers for use in the presently disclosed composite media may include, but are not limited to, polyesters (e.g. poly(ethylene terephthalate) ("PET"), poly(butylene terephthalate ("PBT"), poly(trimethylene terephthalate) ("PTT"), poly(ethylene naphthalate) ("PEN"), poly(cyclohexylenedimethylene terephthalate) ("PCT"), polylactic acid), polyamides (e.g., poly(hexamethylene adipamide) ("nylon 6,6") and polycaprolactam ("nylon 6,6"), co-polyamides, polyethylenes (e.g., high-density polyethylene (HDPE) and linear low-density polyethylene (LLDPE), polypropylenes, polystyrenes, polyurethanes, and polyoxymethylenes (i.e., acetal).

The bicomponent fibers may comprise two different polymeric materials having different melting temperatures. Wither regard to melting temperature (T), polymers typically have an "onset melting point" or "$T_{omp}$" and a "peak melting point" or "$T_{pmp}$," as determined by differential scanning calorimetry. Polymers have complex melting temperatures, unlike water-ice, and a $T_{omp}$ and a $T_{pmp}$ for a given polymer may be broadly defined by a temperature range. In some embodiments, the different polymeric materials may have onset melting temperatures that differ by at least about 10, 20, 30, 40, or 50° C. In other embodiments, the different polymeric materials may have onset melting temperatures that differ by no more than about 60, 50, 40, 30, or 20° C. In further embodiments, the different polymeric materials may have onset melting temperatures that differ within a range of temperatures (e.g., 10-60, 10-50, 10-40, 10-30, 10-20, 20-60, 20-50, 20-40, 20-30, 30-60, 30-50, 30-40, 40-60, 40-50, or 50-60° C. The melting temperatures of some polymeric materials that are suitable for preparing the bicomponent fibers contemplated herein are shown in Table 2. In some embodiments, where the different polymers have temperatures ranges for their $T_{omp}$, the difference in $T_{omp}$ for the two polymers may be calculated by taking the highest temperature value for the $T_{omp}$ of one polymer and subtracting this temperature value from the lowest value for the $T_{omp}$ of the other polymer. For example, the bicomponent fibers might be formed from PBT having a $T_{omp}$ of 220-230° C. and from Nylon 6.6 having a $T_{omp}$ of 245-255° C. In this case, the highest value for the $T_{omp}$ of PCT is 230° C. and the lowest value for the $T_{omp}$ of Nylon 6,6 is 245° C., so the temperature difference may be calculated as 245-230=15° C. This same calculation may be performed to determine the temperature difference between two $T_{pmp}$'s for two different polymers, where the two different polymers have temperatures ranges for their $T_{pmp}$'s.

In the disclosed composite media, Layers A, B, C, and/or D may comprise or consist of bicomponent polymer fibers, ideally produced by meltspinning to yield the appropriate fiber diameter as contemplated herein. The bicomponent polymeric fibers of Layers A, B, C, and/or D, facilitate bonding of the layers in order to form the composite media material. Bicomponent polymeric fibers have been described (see, e.g., WO2005059219A1), and typically comprise or consist of fibers, with a two or more components in cross-section, such as a core and sheath (or skin) in cross-section. In such a configuration, the core is composed of a different polymer than the polymer of the sheath. As utilized in Layers A, B, and/or D of the filter media contemplated herein, the outermost sheath polymer may have a lower melting point than the innermost core polymer and a lower melting point than the Layer C polymer. This configuration facilitates bonding (e.g., via ultrasonic bonding) of Layer A, B, and/or D to Layer C while maintaining the integrity of Layer C, and also enables the use of less energy in the bonding process, which in turn, may reduce damage to Layer C. This configuration also enables higher melting point polymers to be used for the core, imparting characteristics to Layers A, B, C and/or D, as a whole, different than would be otherwise achievable. Such characteristics may include, but not be limited to fiber diameter, stiffness, melting point, elasto-tensile strength, and the like.

Composite media formed by bonding Layer A, optional Layer B. Layer C, and Layer D functions to resist premature plugging. Layer B is optional, however it is contemplated that there could be one or more layers between Layers A and C conforming to the characteristics and design practices that are described herein.

The first upstream layer, Layer A, is more open and exhibits lower particle removal, than Layer B and succeeding layers upstream of Layer C. Each of these successive layers after Layer A exhibits higher particle removal than its preceding layer. This is done by decreasing the fiber diameter, porosity and/or pore size of each successive layer. Collectively, these layers are designed to provide progressively higher removal for particles of a given size and to remove progressively smaller particles than the preceding layers. In addition to increasing service life, Layers A and B secondarily protect the structure of the primary filtration Layer C during manufacturing and processing of the media. In some embodiments, Layer A may be meltspun or meltblown material. In some embodiments, Layer B and succeeding layers upstream of Layer C are preferably produced by meltblowing or meltspinning to produce fibers with appropriate fiber diameter, pore size, particle removal, and processing characteristics.

Layer C is primarily the filtration layer of the media and its properties may be configured for specific applications. Layer C comprises polymeric micro- or nano-fibers or a mixture of polymeric micro- and nano-fibers. Layer C typically has physical and particle removal properties appropriate for the particular application.

Layer D provides support and protection during processing for the upstream layers. In such conventional media, Layer D typically comprises or consists of relatively "open" media having sufficient strength to support the upstream layers of media under conditions of use. Layer D also facilitates processing of the upstream layers of media. In preparing the composite media, the integrity of the individual media layers should be retained during compositing (i.e., after combining of the various media layers into the final laminate, each layer of the laminate retains its individual characteristics).

Figure 3:
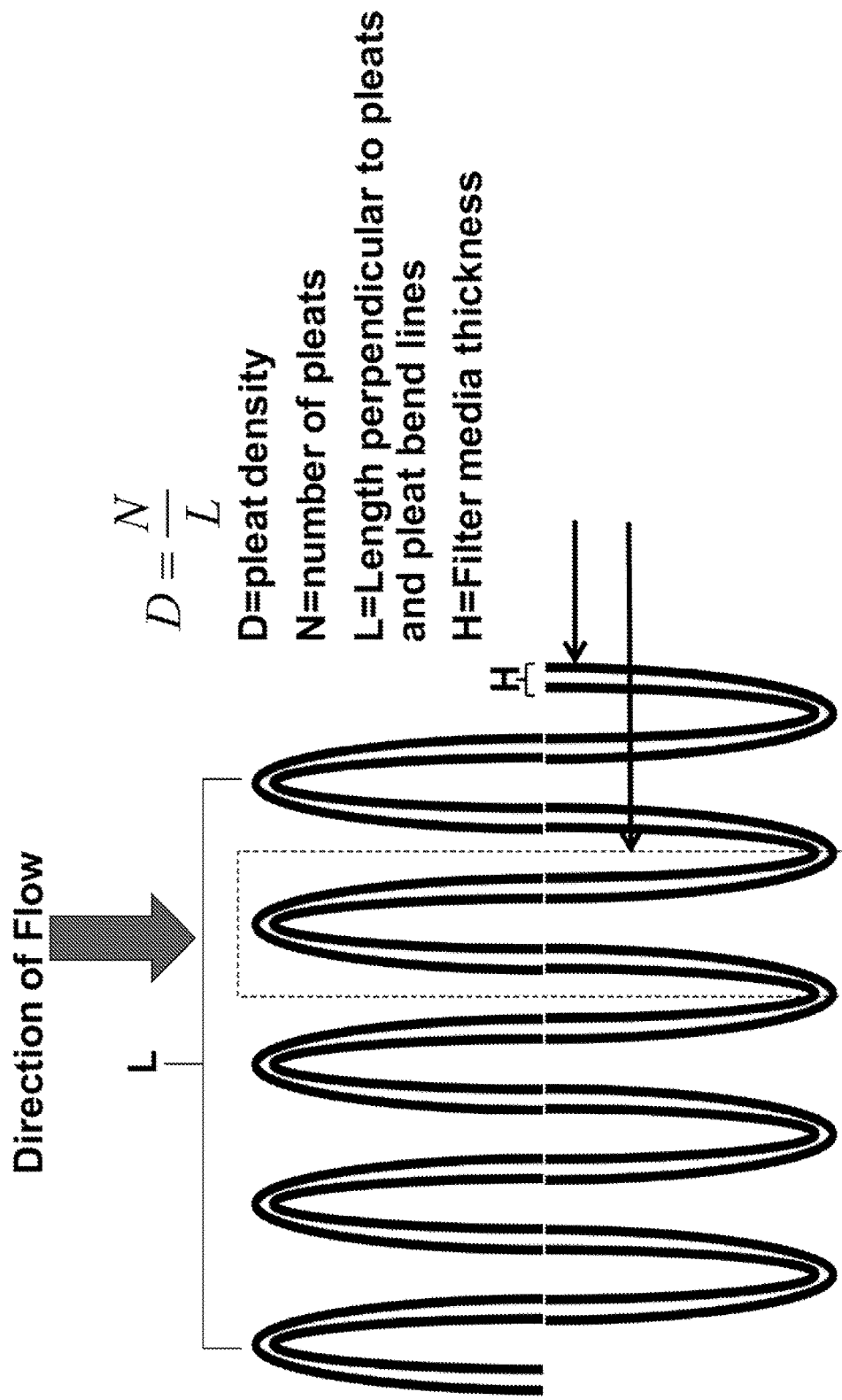
FIG. 3 illustratively provides definitions for terms used herein for describing a pleated form of the presently disclosed composite media.
Figure 4:
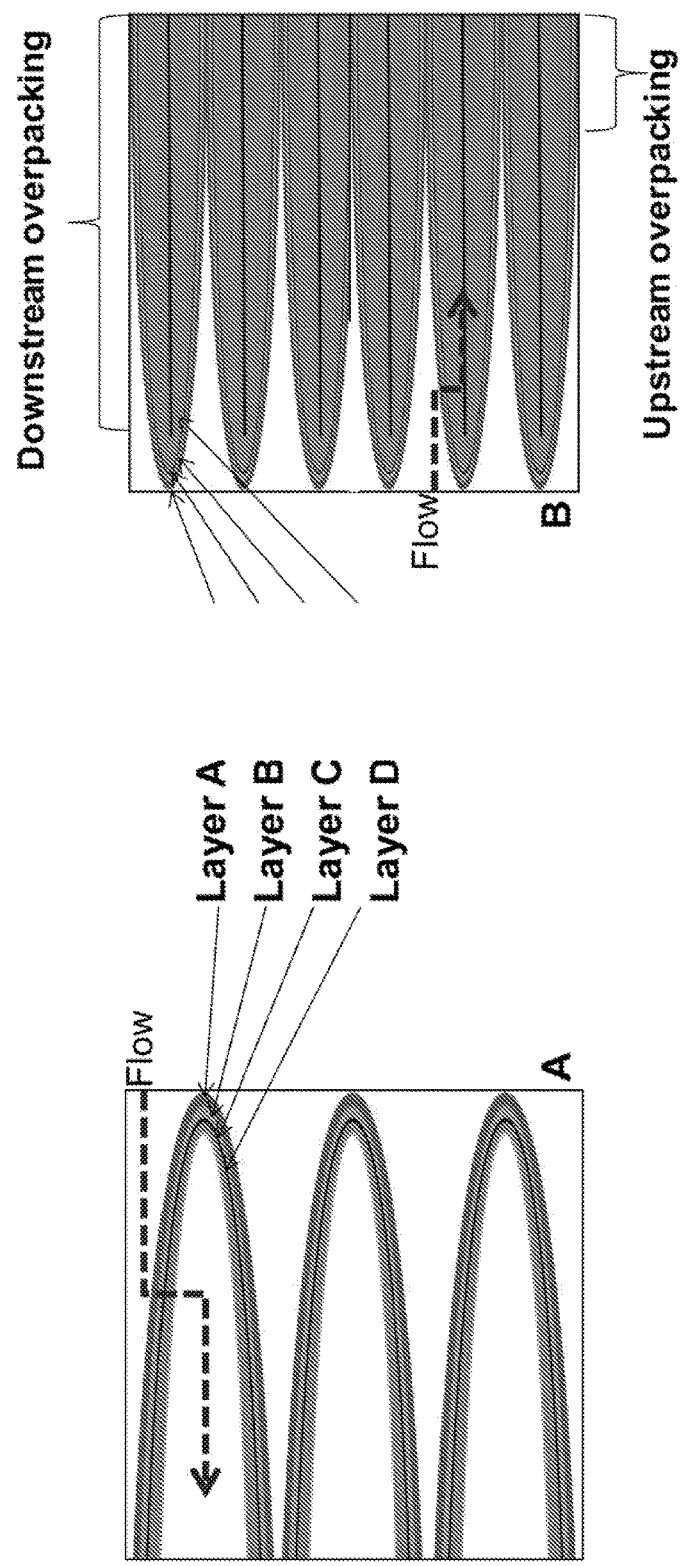
FIG. 4 provides a schematic illustration of a cross-section of one embodiment of pleated coalescing media as contemplated herein. (A) Normal pleat density, D<1/(2H); and (B) overpacked condition, D>1/(2H).

The presently disclosed media may be configured as pleated coalescing media. (See FIGS. 3 and 4). The number of pleats per unit length in a direction normal to the flow and perpendicular to the pleats (i.e., perpendicular to the depth of the pleats and pleated media bend lines), is referred to as pleat density, D. Overpacking occurs when the pleat density is so high that the media from opposing faces of a pleat touch. FIG. 4 schematically illustrates pleated media in a normal and overpacked condition. The theoretical maximum pleat density for conventional filter media is limited by the thickness of the filter media, H, and is equal to 1/(2H). Overpacking refers to the condition in which the pleat density of a filter exceeds this theoretical maximum pleat density.

The presently disclosed composite media may be configured for use in a variety of coalescing or filtration applications such as pleated configurations for use in fuel/water separator and hydraulic filter applications. The presently disclosed composite media typically retains its contaminant removal characteristics, yet resists premature plugging, even in an pleated, over-packed state.

The present inventors have discovered that the relative concentration of fine particles smaller than about 5 μm is elevated in fuel and hydraulic filter applications. In some embodiments of the presently disclosed composite media for use in fuel and hydraulic filter applications, the composite media may be configured as pleated media for removing particles smaller than about 5 μm. Preferably, the media resists premature plugging by elevated concentrations of particles smaller than 5 μm and semisolids. Where pleated forms of the presently disclosed composite media are used in such applications, Layer C may be as thin as practical while retaining the desired particle removal characteristics. This enables the use of pleated forms of the media in an over-packed condition with high pleat densities to achieve the desired service life.

The presently disclosed media may be configured for use in filter element as pleated media in an over-packed condition (i.e., where D>1/(2H). Composite media suitable for use in over-packed filter elements may be obtained via a selected configuration of Layer D. In conventional laminate filter media, Layer D provides support and protection during processing for the upstream layers, in such conventional media, Layer D typically comprises or consists of relatively "open" media having sufficient strength to support the upstream layers of media under conditions of use. Layer D also facilitates processing of the upstream layers of media. As disclosed herein, Layer D, as shown in Table 1, provides the additional function of enabling the media to be used in an over-packed condition with minimal or no loss of effective filter media surface area, unlike conventional laminate media. As disclosed herein, Layer D is intended to compress at high pleat densities in a manner that minimizes the adverse effects on pressure drop and contaminate removal. As such, Layer D may serve as a "crumple zone," such that the fluid flows parallel to the surface of pleat, instead of normal to the surface as in conventional media, with minimal increase in restriction in an over-packed condition.

In pleated configurations of the disclosed composite media, undesirable compression of Layer D at high pleat densities may be minimized via using a relatively large fiber diameter for the media of Layer D, texturing of the surface of Layer D, and minimizing the thickness of Layer D. For example, Layer D may comprise polymeric fibers with geometric mean diameter greater than 10 µm, and ideally greater than 40 µm, typically produced by meltspinning or meltblowing. Additionally, Layer D may have an uncompressed thickness of less than 0.56 mm, and generally greater than 0.1 mm. Media with Layer D meeting these requirements, even in compressed form, remains sufficiently open to permit fluid flow, thus exhibiting longer service life and more efficient utilization of the filter media surface area compared to media without such a layer. In an over-packed condition, existing filter media used to filter fluids enriched in particles smaller than about 5 µm exhibit heavy loading with contaminates near the pleat peaks but little to no visible loading near the peak valleys. In contrast, over-packed media with Layer D as described herein exhibits nearly uniform contaminant loading across the entire depth of the pleat.

Resistance to collapse for pleated forms of the composite media may be further increased by texturing the downstream surface of Layer D. This can be done by embossing or thermally processing the media to yield a three dimensional textured or grooved structure aligned in the machine direction of the media on the downstream side of Layer D. In a filter element utilizing such grooved media, the grooves of the media may be aligned in the machine direction of the media (i.e., in a direction approximately parallel to the depth of the pleats, or perpendicular to the pleated media bend lines), or the grooves may extend radially for cylindrical filter elements. Grooves or texture as shallow as about 0.1 mm may be utilized.

Figure 5:
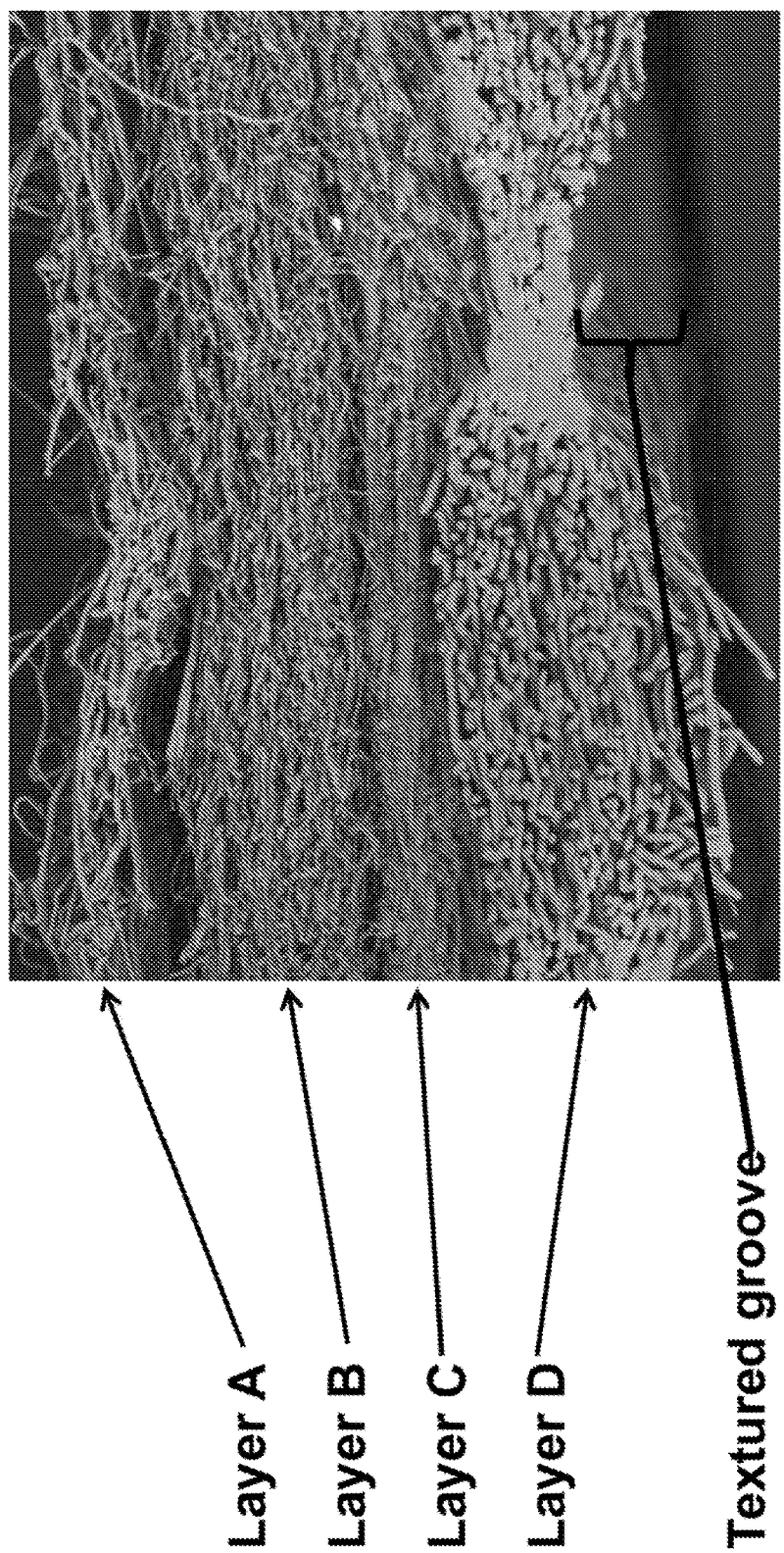
FIG. 5 provides a scanning electronic micrograph of a cross-section of one embodiment of high performance composite filter media as contemplated herein, showing the layers and a textured groove on the downstream face of Layer D.

In some embodiments of the disclosed composite media for fuel, hydraulic, and other demanding industrial applications, maximum thickness of Layer D is less than about 0.56 mm and a Layer D has a grooved surface. FIG. 5 shows a micrograph of a cross-section of Layer D as described in Table 1 having a grooved surface. Depending on the specific characteristics of the composite media described in this application, increases in pleat density from 11.1 to 32.0% may be achieved along with corresponding increases in capacity and service life. These increases in capacity and service life may be achieved by using the media in an over-packed condition.

In specific embodiments, the composite media may be prepared from Layer D comprising or consisting of polymeric filter media with the following properties: (1) a fiber diameter greater than 10 µm, mean pore size greater than 20 µm, permeability greater than 40 cfm, and thickness less than 0.56 mm to enable significantly higher pleat density and correspondingly higher contaminant holding capacity and service life; (2) a capability of being over-packed, i.e., where the pleat density is in excess of the 1/(2H), without significant performance penalty; and (3) optionally, comprising or consisting of bicomponent fibers.

In some embodiments of the composite media, Layer A need not be as thick as Layer D. However, Layer A must still have high enough porosity and large enough fiber diameter, to allow flow to pass through the layer in a direction essentially parallel to the surface of Layer C with minimal restriction. If Layer A does not have high enough porosity and large enough fiber diameter, restriction may be excessive and over 50 percent of the media may not be fully utilized, as shown in FIG. 4. The physical characteristics described herein enable the use of over-packed media to increase the optimal pleat density. Thus, increased useful filter media surface area and service life can be achieved for demanding applications, like lube, hydraulic and fuel filtration where the contaminant size distribution is dominated by particles finer than about 5 µm.

In particular, the disclosed laminate media may include a Layer A comprising or consisting of polymeric filter media with the following properties: (1) a fiber diameter greater than 8 µm, mean pore size greater than 25 µm, permeability greater than 80 cfm, and thickness less than 0.50 mm to enable significantly higher pleat density and correspondingly higher contaminant holding capacity and service life; (2) a capability of being over-packed, i.e., where the pleat density is in excess of the 1/(2H), without significant performance penalty; and (3) optionally, comprising or consisting of bicomponent fibers. In particular, the disclosed laminate media may include a Layer A and/or a Layer D, as just described.

Exemplary configurations of layers for preparing the composite media disclosed herein are disclosed in U.S. Published Application No. 2011/0168621, published on Jul. 14, 2011, and U.S. Published Application No. 2011/0168647, published on Jul. 14, 2011, the contents of which are incorporated herein by reference. These applications disclose a multilayer media having one or more of the following characteristics: Layer A: nominal mean fiber diameter >10 µm; mean pore size >50 µm; maximum pore size >100 µm; permeability 225-325 cfm; thickness 0.3-0.5 mm; and basis weight 48±10 gsm. Layer B: nominal mean fiber diameter 1.0-5.0 µm; mean pore size 5.0-15.0 µm; maximum pore size 10.0-25.0 µm; permeability 35-55 cfm; thickness 0.1-0.3 mm; and basis weight 38±10 gsm. Layer C: nominal mean fiber diameter 0.1-0.8 µm; mean pore size 1.0-8.0 µm; maximum pore size 1.0-10.0 µm; permeability 3.0-20.0 cfm; thickness 0.1-0.3 mm; and basis weight >20 gsm. Layer D: nominal mean fiber diameter >40 µm; mean pore size 30-35 µm; maximum pore size 40-65 µm; permeability 50-75 cfm; thickness 0.45-0.65; and basis weight 198±20 gsm.

Composite filter media as disclosed herein was tested using PTI 0-5 µm test dust, which is a surrogate for the contaminants found in actual fuel applications, and using ISO Fine Test Dust, which is a coarser contaminant specified in SAE fuel filter test standards. With ISO Fine, the capacity of over-packed elements was reduced by large particles loading the upstream portion of pleats and the full media surface area was not fully utilized. With PTI 0-5 µm dust, full utilization of the surface area and higher capacity was obtained when the fiber diameter of the media in Layer A was greater than about 8 µm, but not when finer fibers were used for Layer A.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof but it is recognized that various modifications are possible within the scope of the invention. Thus, it should be understood that although the present invention has been illustrated by specific embodiments and optional features, modification and/or variation of the concepts herein disclosed may be resorted to by those skilled in the art and that such modifications and variations are considered to be within the scope of this invention.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

TABLE 1

Exemplary Media Layers and Properties of Laminate Media

| Layer | Material | Nominal Mean Fiber Diameter (μm) | Mean Pore Size (μm) | Maximum Pore Size (μm) | Permeability (cfm) | Thickness (mm) | Basis Weight (gsm) |
|---|---|---|---|---|---|---|---|
| A | Polybutylene terephthalate | >8 | >25 | >30 | 80-325 | 0.1-0.5 | 20-60 |
| B | Polybutylene terephthalate | 1-5 | 5-15 | 10-25 | 25-55 | 0.1-0.5 | 15-50 |
| C | Polyamide | 0.1-5 | 1-15 | 1-25 | 3-55 | 0.1-0.5 | 8-50 |
| D | Polyethylene terephthalate | >10 | >20 | >40 | 40-200 | 0.10-0.56 | 40-180 |

TABLE 2

| Material | Onset Melting Point ($T_{omp}$), ° C. | Peak Melting point ($T_{pmp}$), ° C. |
|---|---|---|
| PBT | 220-230 | 223-230 |
| PET (film grade) | 240-250 | 250-260 |
| PET (Meltblown grade) | 200-220 | 210-230 |
| PTT | 215-235 | 225-235 |
| PEN | 255-265 | 265-275 |
| PCT | 275 | 285 |
| PLA | 140-150 | 150-160 |
| co-polyamides (PA 4,14) | 200-210 | 210-220 |
| PA46 | 280 | 285 |
| polycaprolactam (Nylon 6) | 220-235 | 225-235 |
| poly(hexamethylene adipamide) (Nylon 6,6) | 245-255 | 255-265 |
| PA610 | 200-210 | 210-220 |
| PA612 | 210-220 | 220-230 |
| PA11 | 145 | 155 |
| PA12 | 120-130 | 130-140 |
| PPS (Polyphenylene sulfide) | 275-280 | 285-290 |
| PTFE (polytetrafluoroethylene) | 315-320 | 325-330 |
| PVDF Polyvinylidene Fluoride | 160-165 | 170-175 |

We claim:

1. A composite media comprising:
   at least three layers of media material, the at least three layers of media material bonded together and include, from an upstream direction to a downstream direction, a Layer A, a Layer C, and a Layer D,
   wherein one or more layers adjacent to the Layer C consists of bicomponent polymeric fibers,
   wherein the Layer A comprises polymeric media material having a nominal mean fiber diameter of greater than about 10 μm; the Layer C comprises polymeric media material comprising nanofibers and having a mean pore size of 0.2-10 μm; and the Layer D comprises polymeric media material having a nominal mean fiber diameter greater than about 10 μm and provides support for the preceding layers,
   wherein the composite media is configured as a pleated filter media,
   wherein the pleated filter media has a pleat density that exceeds 1/(2H), wherein H is a thickness of the composite media, and
   wherein the polymeric media material of Layer D is textured and comprises grooves in a direction perpendicular to bend lines in pleats of the Layer D.

2. The composite media claim 1, wherein the bicomponent polymeric fibers comprise two different polymeric materials, wherein one of the two different polymeric materials has a different onset melting point than an onset melting point of another of the two different polymeric materials.

3. The composite media of claim 2, wherein the onset melting points of the one of the two polymeric materials and the other of the two different polymeric materials differ by at least 10° C.

4. The composite media of claim 1, wherein the bicomponent polymeric fibers comprise a core and sheath in cross-section, the core and sheath each comprise a polymeric material, wherein the polymeric material of the core is a different polymeric material than the polymeric material of the sheath, and wherein the polymeric material of the sheath has a melting temperature that is lower than a melting temperature of the polymeric material of the core.

5. The composite media of claim 4, wherein the Layer A consists of the bicomponent polymeric fibers, and the melting temperature of the polymeric material of the sheath is lower than a melting temperature of the polymeric media material of the Layer C.

6. The composite media of claim 4, further comprising a Layer B disposed between the Layer A and the Layer C, wherein the Layer B consists of the bicomponent polymeric fibers, and the melting temperature of the polymeric material of the sheath is lower than a melting temperature of the polymeric media material of the Layer C.

7. The composite media of claim 4, wherein the Layer D consists of the bicomponent polymeric fibers, and the melting temperature of the polymeric material of the sheath is lower than a melting temperature of the polymeric material of the Layer C.

8. The composite media of claim 4, wherein the Layer A and the Layer D consist of the bicomponent polymeric fibers, and the melting temperature of the polymeric material of the sheath is lower than a melting temperature of the polymeric material of the Layer C.

9. The composite media of claim 4, further comprising a Layer B disposed between the Layer A and the Layer C, wherein the Layer A, the Layer B, and the Layer D consist of the bicomponent polymeric fibers, and the melting temperature of the polymeric material of the sheath is lower than a melting temperature of the polymeric material of Layer C.

10. The composite media of claim 1, wherein one or more layers are bonded to one or more adjacent layers via ultrasonic bonding.

11. The composite media of claim 1, wherein the Layer A comprises polymeric media material having a mean pore size of greater than about 25 µm.

12. The composite media of claim 1, wherein the Layer A comprises polymeric media material having a maximum pore size of greater than about 30 µm.

13. The composite media of claim 1, wherein the Layer A comprises polymeric media material having a permeability of 80-325 cfm.

14. The composite media of claim 1, wherein the Layer A comprises polymeric media material having a thickness of 0.1-0.5 mm.

15. The composite media of claim 1, wherein the Layer A comprises polymeric media material having a basis weight of 20-60 gsm.

16. The composite media of claim 1, wherein the Layer C comprises polymeric media material having a nominal mean fiber diameter of 0.1-5 µm.

17. The composite media of claim 1, wherein the Layer C comprises polymeric media material having a maximum pore size of 1-25 µm.

18. The composite media of claim 1, wherein the Layer C comprises polymeric media material having a permeability of about 3-55 cfm.

19. The composite media of claim 1, wherein the Layer C comprises polymeric media material having a thickness of 0.1-0.5 mm.

20. The composite media of claim 1, wherein the Layer C comprises polymeric media material having a basis weight of 8-50 gsm.

21. The composite media of claim 1, wherein the Layer D comprises polymeric media material having a nominal mean fiber diameter greater than 15 µm.

22. The composite media of claim 1, wherein the Layer D comprises polymeric media material having a mean pore size greater than 20 µm.

23. The composite media of claim 1, wherein the Layer D comprises polymeric media material having a maximum pore size greater than 40 µm.

24. The composite media of claim 1, wherein the Layer D comprises polymeric media material having a permeability of 40-200 cfm.

25. The composite media of claim 1, wherein the Layer D comprises polymeric media material having a thickness of 0.1-0.56 mm.

26. The composite media of claim 1, wherein the Layer D comprises polymeric media material having a basis weight of 40-180 gsm.

27. The composite media of claim 1, further comprising a Layer B disposed between the Layer A and the Layer C, wherein the Layer B comprises polymeric media material having one or more of the following characteristics: (a) a nominal mean fiber diameter of 1-5 µm; (b) a mean pore size of 5-15 µm; (c) a maximum pore size of 10-25 µm; (d) a permeability of 25-55 cfm; (e) a thickness of 0.1-0.5 mm; and (f) a basis weight of 15-50 gsm.

28. The composite media of claim 1, further comprising a Layer B disposed between the Layer A and the Layer C, wherein at least one of the Layer A, the Layer B, the Layer C, and the Layer D comprises polymeric material selected from a group consisting of polyamide material, polybutylene terephthalate material, polyethylene terephthalate material, and polyester material.

29. The composite media of claim 1, wherein the one or more layers adjacent to the Layer C consists of bicomponent polymeric fibers that have been meltspun or meltblown.

30. The composite media of claim 1, wherein the Layer C comprises polyamide material.

31. The composite media of claim 1, further comprising a Layer B disposed between the Layer A and the Layer C, wherein at least one of the Layer A and the Layer B comprise polybutylene terephthalate material.

32. The composite media of claim 1, wherein the Layer D comprises polyethylene terephthalate material.

* * * * *